US012748872B2

(12) United States Patent
Meedinti Bhaskara Reddy et al.

(10) Patent No.: US 12,748,872 B2
(45) Date of Patent: Sep. 29, 2026

(54) MULTIPLE ARTIFICIAL INTELLIGENCE SYSTEMS FOR USE WITH DYNAMIC ACCESS CAPABILITIES

(71) Applicant: Bank of America Corporation, Charlotte, NC (US)

(72) Inventors: Harinath Meedinti Bhaskara Reddy, Charlotte, NC (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 369 days.

(21) Appl. No.: 18/197,772

(22) Filed: May 16, 2023

(65) Prior Publication Data

US 2024/0386120 A1 Nov. 21, 2024

(51) Int. Cl.
*G06F 21/62* (2013.01)
*G06F 21/60* (2013.01)
*G06N 3/04* (2023.01)

(52) U.S. Cl.
CPC ........ *G06F 21/6218* (2013.01); *G06F 21/602* (2013.01); *G06N 3/04* (2013.01)

(58) Field of Classification Search
None
See application file for complete search history.

(56) References Cited

U.S. PATENT DOCUMENTS 11,954,238 B1 * 4/2024 Tan ........................ H04L 9/0891
2004/0098366 A1 * 5/2004 Sinclair .................. G06Q 10/00
2007/0112954 A1 * 5/2007 Ramani ................... H04L 43/10 709/224
2016/0352695 A1 * 12/2016 Kozolchyk ......... H04L 67/1097
2018/0176197 A1 * 6/2018 Matthews ........... H04L 63/0807
2021/0234673 A1 * 7/2021 Kurian .................. H04L 9/3234
2021/0234693 A1 * 7/2021 Kurian .................... H04L 9/088
2022/0198053 A1 * 6/2022 Madhavan .............. G06F 21/31
2022/0398397 A1 * 12/2022 Gangadhar ....... G06F 18/24765
2024/0045988 A1 * 2/2024 Wong .................. G06F 21/6245

FOREIGN PATENT DOCUMENTS

KR 20070114725 A * 12/2007 ......... G06F 21/6227
WO WO-2023163960 A1 * 8/2023 ......... G06F 21/6218

* cited by examiner

*Primary Examiner* — Eleni A Shiferaw
*Assistant Examiner* — Duilio Munguia
(74) *Attorney, Agent, or Firm* — Weiss & Arons LLP

(57) ABSTRACT

A system and method for sharing sensitive data which may minimize the risk of unapproved data access. The system may include a data network, a data orchestrator, data storage units, controllers, user devices, and a data map. The data storage units may contain sensitive data with metadate encryptions in a dormant state. The data orchestrator may be configured to implement machine learning systems to: categorize and layer the sensitive data in the data storage units; receive a user key and a device key from the user device; look up the data map for level of access of the key-bearing user device; provide the keys as pre-authorization to the controllers; after the data storage units are woken up, provide keys to the metadata to gain access to the sensitive data; retrieve and provide the sensitive data to the user device; and revert the sensitive data back to the dormant state.

3 Claims, 6 Drawing Sheets

MULTIPLE ARTIFICIAL INTELLIGENCE SYSTEMS FOR USE WITH DYNAMIC ACCESS CAPABILITIES

FIELD OF TECHNOLOGY

Aspects of the disclosure relate to storage of sensitive data. Specifically, aspects of the disclosure relate to secure storage of sensitive data.

BACKGROUND OF THE DISCLOSURE

A large network of data or a complex data mesh may include sensitive and secure data at various locations in the network or mesh. Various users, each with their own credentials, may desire to access some of the sensitive data but not all of it. While providing access to sensitive data, a user may incidentally gain access to sensitive data at a level of sensitivity that is above the user's credential level. Furthermore, when the user's access to the sensitive data is open, an intruder may take advantage and utilize the opening to obtain unapproved access to the sensitive data. These scenarios and others may lead to a compromise in the security of the sensitive data.

It would be desirable to be able to share sensitive data in a data storage framework with a user in accordance with both the data's level of sensitivity and the user's level of credentials.

It would further be desirable to protect sensitive data from exposure to a user, where the data has a higher level of sensitivity than the user's credentials permit access.

It would further be desirable to protect all sensitive data from being accessed by an unauthorized third party.

It would be desirable, therefore, to provide systems and methods for providing access to sensitive data at an appropriate level according to a user's credentials while protecting sensitive data from unauthorized access.

SUMMARY OF THE DISCLOSURE

It is an object of the invention to arrange sensitive data in layers such that a user can readily access the sensitive data across a data network or data mesh in accordance with the user's level of credentials. It may be advantageous to utilize artificial intelligence and/or machine learning (AI/ML) systems to arrange the data in layers such that the accessor can access data according to their level of credentials.

It is a further object of the invention to protect sensitive data from being exposed to the user when the sensitive data requires credentials that the user does not possess. It may be advantageous to utilize AI/ML systems to store, offload, and/or distribute the data according to the layer to which it has been assigned.

It is another object of the invention to protect all sensitive data in the data network or data mesh from access by an unauthorized party. It may be advantageous to run AI/ML systems on a data orchestrator to generate a dynamic level for the sensitive data. The sensitive data may be dynamically activated and/or awakened when a user presents appropriate credentials and then deactivated and/or made dormant when the access is no longer needed.

Apparatus and methods are herein provided to meet the above outlined objectives of the invention.

Aspects of the disclosure may relate to apparatus and methods for sharing sensitive data at a credential appropriate level in a manner that may minimize risk of unapproved, uncredentialed, and/or under credentialed access to sensitive data.

Methods may include sharing sensitive data stored in data storage units across a data network and/or a data mesh that may minimize risk of unapproved access to sensitive data. The method may include configuring a data orchestrator to implement machine learning systems. The method may include configuring a data orchestrator to implement artificial intelligence systems. The data orchestrator may communicate with data storage units located in a data network. The data orchestrator may communicate with data storage units located in a data mesh. The data orchestrator may implement a machine learning system to categorize sensitive data within data storage units according to sensitivity of the data. The data orchestrator may implement a machine learning system to layer sensitive data within data storage units according to sensitivity of the data. The machine learning system may tokenize the sensitive data in the data storage units by creating a token in the metadata of the sensitive data that corresponds to the sensitivity of the data. The machine learning system may encrypt the sensitive data in the data storage units by creating a key in the metadata of the sensitive data that corresponds to the sensitivity of the data. The data orchestrator may receive a user token from a user of a user device. The data orchestrator may receive a device token from a device of a user device. The data orchestrator may receive a user token and a device token from a user device. The data orchestrator may receive a user key from a user of a user device. The data orchestrator may receive a device key from a device of a user device. The data orchestrator may receive a user key and a device key from a user device.

Methods may include the data orchestrator implementing a machine learning system to optimize the former's communication with a data map. The data orchestrator may look up a data map. The data map may contain information about a user device's authorization to access varying levels of sensitive data based on the user token or key. The data map may contain information about a user device's authorization to access varying levels of sensitive data based on the device token or key. The data map may contain information about a user device's authorization to access varying levels of sensitive data based on the user token or key and the device token or key.

Methods may include the data orchestrator implementing a machine learning system to optimize the former's communication with a data storage unit. The data orchestrator may provide the user token or key. The data orchestrator may provide the device token or key. The data orchestrator may provide both the user token or key and the device token or key. The data orchestrator may present these tokens or keys to a controller positioned between the data orchestrator and a data storage unit. After receiving the tokens or keys, the controller may communicate with the data storage unit to wake the latter up from a dormant state. The controller may communicate by way of a backchannel to the data storage unit. The data orchestrator may receive clearance from the controller to access the data storage unit. The data orchestrator may then communicate directly with the data storage unit. The data orchestrator may communicate with the data storage unit through the controller. The data orchestrator may provide the user token or key, the device token or key, or both the user token or key and device token or key directly to the data storage unit. The data orchestrator may then retrieve data according to the level of access granted. The level of access granted may be a function of the access allowed based on the rules in the data map. The level of access granted may be a function of which sensitive data is accessible with the user token or key and the device token or key, or both the user and device tokens or keys. The data orchestrator may provide the retrieved data to the user device.

In some circumstances, the user device may require continued access to the sensitive data. In such a circumstance, the user device may send continual or periodic signals or a heartbeat. The heartbeat may be a periodic signal generated by the user device and provided to the data orchestrator to indicate an ongoing requirement to receive the sensitive data. When receiving such a signal or heartbeat, the data processor may maintain the flow of data from the data storage units to the user device. When ceasing to receive the signal or heartbeat, the data orchestrator may provide instructions to the data storage units to close the user device's access to the sensitive data. The data orchestrator may additionally instruct the data storage units to revert to a dormant state. In the dormant state, sensitive data in the data storage units may be difficult to access by an unapproved, uncredentialed, and/or under credentialed user.

Methods may include the machine learning systems being deep learning systems.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
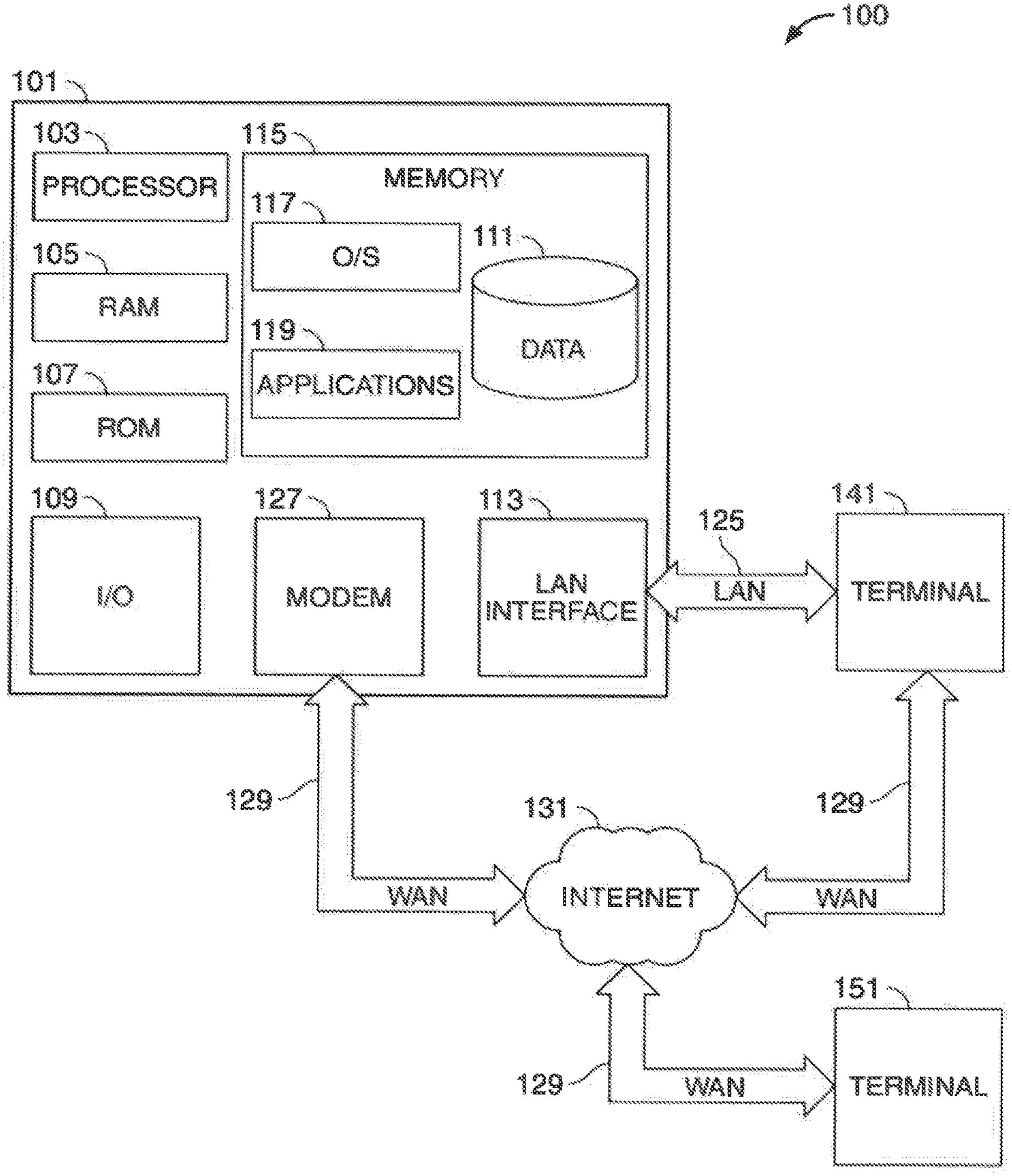
FIG. 1 shows an illustrative block diagram in accordance with principles of the disclosure.

Aspects of the disclosure may relate to apparatus and methods for sharing sensitive data with a user at a level corresponding to the user's credentials in a manner that may minimize risk of unapproved, uncredentialed, and/or under credentialed access to sensitive data.

Apparatus may include a system for sharing sensitive data stored in data storage units across a data network and/or a data mesh in a manner that may minimize risk of unapproved, uncredentialed, and/or under credentialed access to data.

The system may include a data network. The system may include a data orchestrator operating in the data network. The system may include data storage units located in the data network in electronic communication with the data orchestrator. The system may include controllers located in the data network in electronic communication with the data orchestrator and the data storage units. The controller may also be called a gatekeeper. The system may include user devices in the data network in electronic communication with the data orchestrator. The system may include a data map in electronic communication with the data orchestrator.

The system may include a data mesh. The system may include a data orchestrator operating in the data mesh. The system may include data storage units located in the data mesh in electronic communication with the data orchestrator. The system may include controllers located in the data mesh in electronic communication with the data orchestrator and the data storage units. The system may include user devices in the data mesh in electronic communication with the data orchestrator.

A device may be a computer processor. A device may be a computer. A device may be an edge computing device. A device may be a personal computer. A device may utilize any of these examples of a device. The system may include a data map in electronic communication with the data orchestrator.

The data orchestrator may be configured to implement machine learning systems. The data orchestrator may be configured to implement artificial intelligence systems. In the following description of the system, the data orchestrator may include a computer processor running it. In the following description of the system, the data orchestrator may include a machine learning system operating on it. In the following description of the system, the data orchestrator may include an artificial intelligence system operating on it.

A computer processor may implement multiple AI/ML systems on the data orchestrator. A computer processor may use an AI/ML system to create a usage model for the system's users. The AI/ML system may determine if there is an inappropriate use by a particular user which may indicate an impostor attempting to access or accessing the user's account or misappropriation by the user of the user's login credentials. Like how a package comes with a seal to show if the package has been tampered with, the model of usage may show evidence that the login credentials of the user have been tampered with.

A computer processor may implement an AI/ML system that involves, for example, a user who lacks sufficient credentials to access sensitive data which is required by the user. For example, the user may require sensitive data to power a data model. In such a case, or another similar case, the AI/ML system may replace the sensitive data in a way that provides the information in an anonymous way to power the data model without exposing the sensitive data. Alternatively, the AI/ML system may aggregate the sensitive data in a way that provides the information in an anonymous way to power the data model without exposing the sensitive data.

A computer processor may implement an AI/ML system that involves segmenting the data stored in the system. By reducing data storage redundancy and having a mixed data storage scheme, the risk of a data breach may be lessened. Each unauthorized access may yield limited data. Furthermore, other risk reduction measures discussed herein may further reduce potential risk of sensitive data leakage due to an unauthorized data breach.

A computer processor may implement an AI/ML system to mine sensitive data found in data storage across a data mesh. The AI/ML system could determine where sensitive data is stored throughout the data mesh, allowing for rapid retrieval.

A computer processor may implement an AI/ML system that may be implemented in a model to protect the sensitive data from undesired access, for example, from an intruder or from a user who lacks sufficient credentials to access a particular set of sensitive data. For example, the computer processor may implement an AI/ML system where the sensitive data in the data storage units is in a dormant state until being called upon by a user with sufficient credentials. The data storage unit may be awoken for the data's access duration. When access to the data is no longer needed, the data storage unit may revert to a dormant state. This may include using a data orchestrator to provide a dynamic level to the sensitive data, for example, to provide a credentialed user with access to the sensitive data, and then take it away the access when the credentialed user no longer needs access to the sensitive data.

A further aspect to the AI/ML system involving awaking dormant data storage may include tokenizing and/or encrypting the data. For example, the data orchestrator may control access to the data by creating a token or key in the metadata of the data. Access to the data may necessitate possession of the token or key. Alternatively, or complementary, a controller may require a pre-authorization token or pre-authorization key to proceed with requesting access to the data storage unit. The pre-authorization token or key provides another level of protection to the data in the data storage unit. Access may be granted to a user device, for example, only when presenting a valid pre-authorization token or key. However, when no valid user device is presenting a pre-authorization key, the connection to the data storage unit may be shut down. When data is requested, the data storage unit may be woken up for use, but the data storage unit may be maintained in a dormant state. Furthermore, the pre-authorization token or key, together with the token or key in the metadata of the data, may complement each other in creating an even higher level of security to the data. In addition, requiring a separate token or key from a user and the user's device may add one or more additional levels are security.

A computer processor may implement an AI/ML system that responds to a duress state. For example, if the controller is hacked, the AI/ML system may detect the hack and create a duress state. The same or different AI/ML system may respond to hack by presenting access to an empty data storage. The same or different AI/ML system may respond to hack by presenting access to a data storage containing data that is not accurate and/or does not contain sensitive information.

Returning to the description of the apparatus, the apparatus may include a system for sharing sensitive data stored in data storage units across a data network and/or in a data mesh in a manner that may minimize risk of unapproved access to data. The system may include a data network and/or a data mesh. The system may include a data orchestrator operating in the data network and/or data mesh. The system may include data storage units located in the data mesh in electronic communication with the data orchestrator. The system may include controllers located in the data network and/or data mesh in electronic communication with the data orchestrator and the data storage units. The system may include user devices in the data network and/or data mesh in electronic communication with the data orchestrator. The system may include a data network and/or data map in electronic communication with the data orchestrator.

The apparatus may include the data orchestrator configured to implement one or more machine learning systems. The data orchestrator may be configured to receive a user token or key from a user of a user device. The data orchestrator may be configured to receive a device token or key from a user device. The combination of requiring receipt of the user token or key and the device token or key may add to the security of the data in the data storage units. The data orchestrator may be configured to look up in the data map the level of access to data which the user device is entitled based on the user token or key and a device token or key presented. The data orchestrator may be configured to provide the user token or key and the device token or key to one or more controllers positioned between the data orchestrator and the one or more data storage units.

The system may include the controller communicating with the one or more data storage units to wake them up from a dormant state. The system may include the data orchestrator configured to receive clearance from the one or more controllers to access the one or more data storage units. The system may include the data orchestrator configured to provide the user token or key and device token or key to one or more data storage units. The system may include the data orchestrator configured to retrieve the data according to the level of access granted according to rules found in the data map and according to data whose tokens or key in their metadata correlate to the user token or key, the device token or key, or both the user token or key and the device token or key. The system may include the data orchestrator configured to provide the retrieved data to the user device. The system may include the data orchestrator configured to revert the data in the data storage unit back to the dormant state.

The system may include a machine learning system to optimize the data orchestrator's communication with a data storage unit. The data orchestrator may provide the user token or key and the device token or key to a controller positioned between the data orchestrator and a data storage unit. After receiving the user token or key and the device token or key, the controller may communicate with the data storage unit to wake it up from a dormant state. The data orchestrator may receive clearance from the controller to access the data storage unit. The data orchestrator may then communicate directly with the data storage unit. The data orchestrator may communicate with the data storage unit through the controller. The data orchestrator may provide the user token or key and the device token or key directly to the data storage unit. The data orchestrator may then retrieve data according to the level of access granted. The level of access granted may be a function of the access allowed based on the rules in the data map. The level of access granted may be a function of which data is accessible with the user token or key and the device token or key, or both the user and device tokens or keys. The data orchestrator may provide the retrieved data to the user device.

The system may include the data orchestrator communicating with the data storage units located in the data mesh to implement a machine learning system to categorize and layer data within the data storage unit according to sensitivity of the data. The system may include the machine learning system tokenizing or encrypting the data in the data storage units by creating a token or key in the metadata of the data that corresponds to the sensitivity of the data. The system may include the data orchestrator receiving a user token or key from a user of a user device, a device token or key from a device of the user device, or both a user and device token or key.

The system may include a machine learning system to optimize the data orchestrator's communication with a data map. The data map may contain information about the user device's authorization to access varying levels of sensitive data based on the user token or key and the device token or key presented by the user device.

The system may include determining the need of a user device for continued access to the sensitive data. In such a circumstance, the user device may send continual or periodic signals or heartbeat to the data orchestrator. A heartbeat may be a periodic signal generated by the user device and provided to the data orchestrator to indicate an ongoing desire to receive the data. When receiving such a signal or heartbeat, the data orchestrator may maintain the flow of data from the data storage units to the user device. When ceasing to receive the signal or heartbeat, the data orchestrator may provide instructions to the data storage units to close the user device's access to the data. The data orchestrator may additionally instruct the data storage units to revert to a dormant state. The dormant state may make it difficult for an unapproved party to access the data in the data storage units.

The system may include the default setting for the data in the data storage units to be in a dormant state. The system may include two lines of communication between the data orchestrator and the data storage units. One line may be a direct line of communication which may be in a default dormant state. Another line may be a line to a controller which itself has a line of communication with a data storage unit. This line may be in a default open state. When the controller receives a pre-authorization from the data orchestrator, which may be one or more tokens or keys from the user device, the controller may communicate with the data storage unit, for example, by way of a backchannel, to activate out of the dormant state the direct line of communication with the data orchestrator. When the pre-authorization line from the data orchestrator goes silent, the direct communication line between the data orchestrator and the data storage units may also go silent, for example, revert to the dormant state.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein.

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be comprised of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through these I/O modules. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or application programming interface (API). One may understand that web-based, for this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the invention in the context of computer-executable instructions, such as application program (s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for this application's purposes, as engines for the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
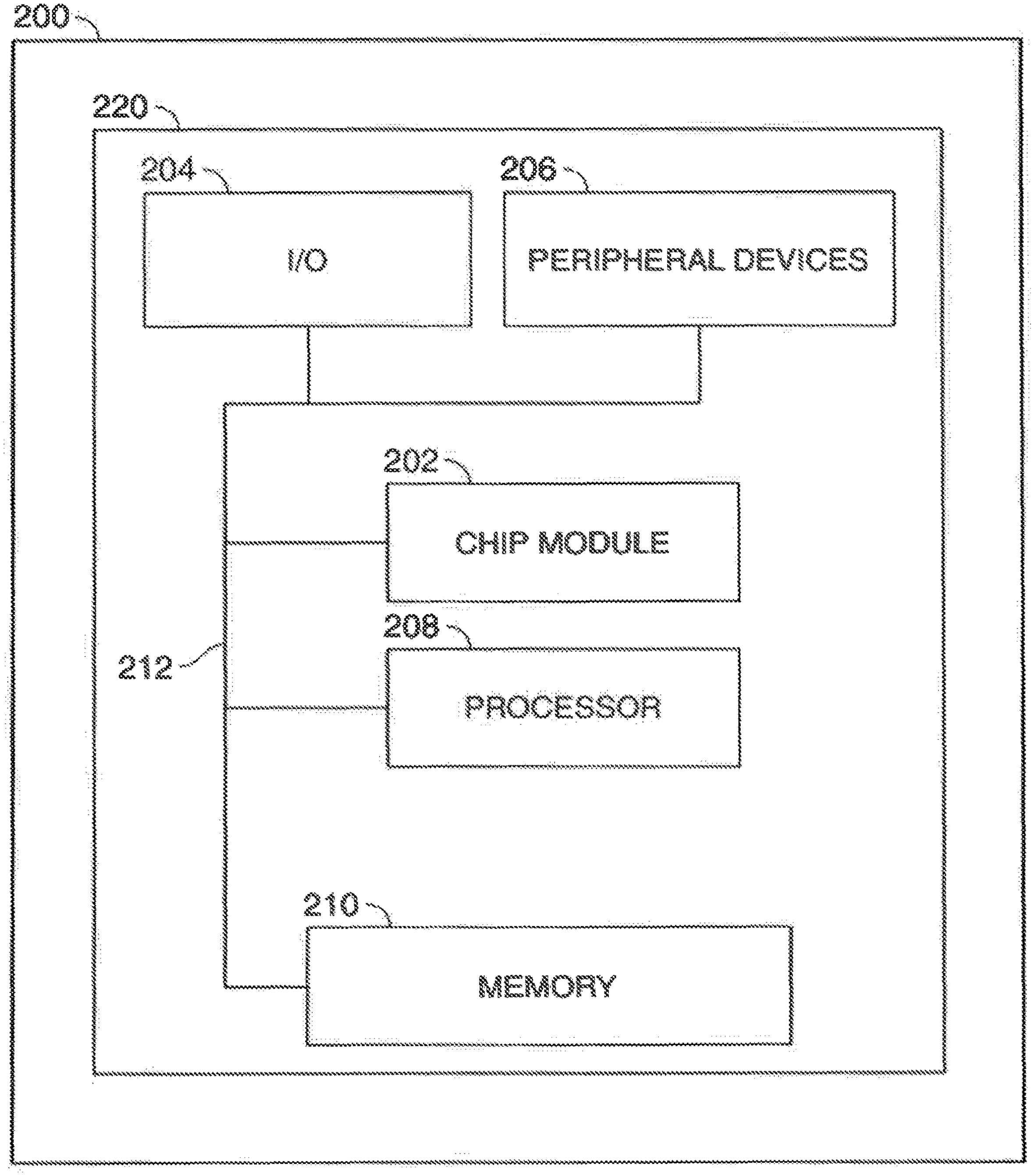
FIG. 2 shows an illustrative block diagram in accordance with principles of the disclosure.

FIG. 2 shows an illustrative block diagram of apparatus 200. One may configure apparatus 200 in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3A:
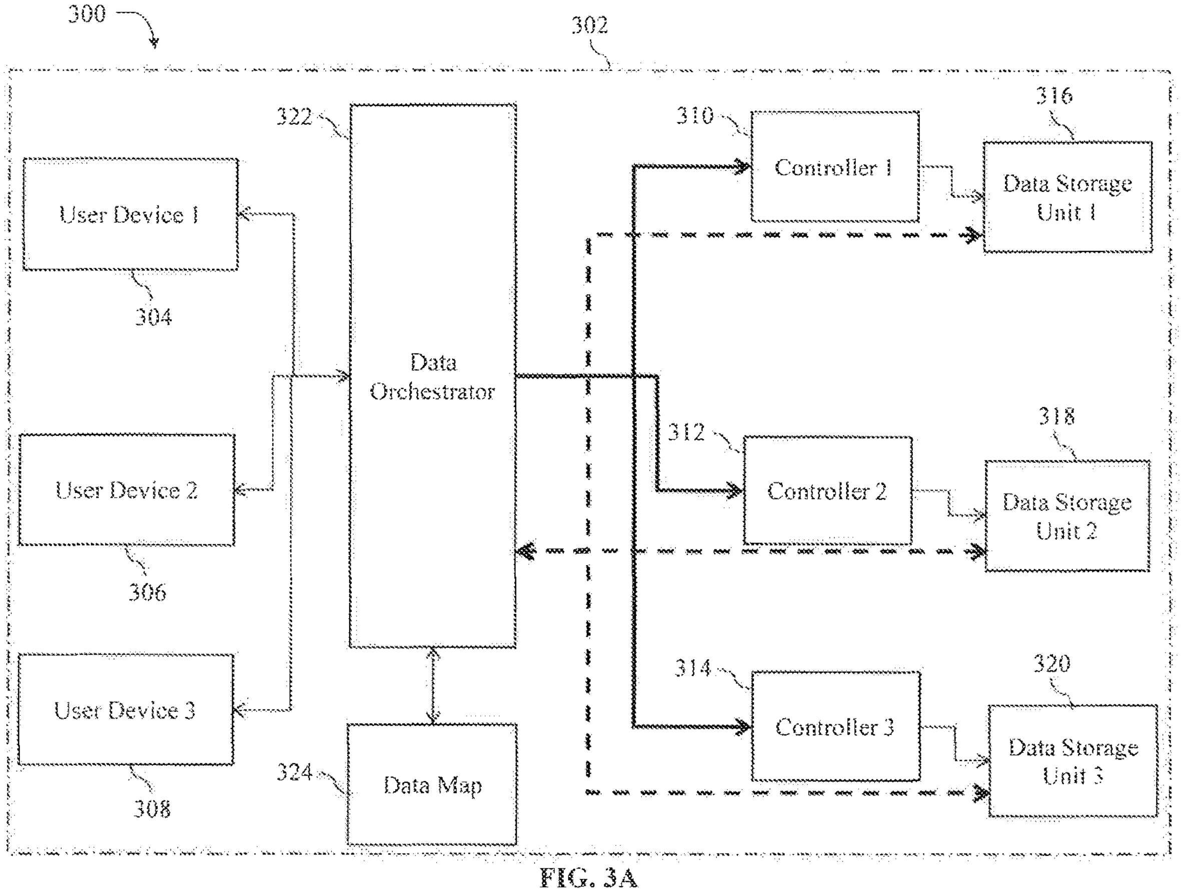
FIGS. 3A-3C show illustrative block diagrams in accordance with principles of the disclosure.

FIG. 3A shows an illustrative diagram 300. A data network or data mesh 302 may be shown. User device 1 304, user device 2 306, and user device 3 308 may have two-way communication with a data orchestrator 322. One of the user devices may request data, transmit data to be stored, and/or transmit signals and/or heartbeats to the data orchestrator 322. The data orchestrator 322 may provide data to one of the user devices, receive a data request from a user device, and/or receive signals and/or heartbeats from a user device. The data orchestrator 322 may communicate with the data map 324 to determine approved access levels of the user devices based on the latter's credentials.

Data orchestrator 322 may communicate with controller 1 310, controller 2 312, controller 3 314 to seek access to data storage unit 1 316, data storage unit 2 318, data storage unit 3 320, respectively, as indicated by the thick solid line. Data orchestrator 322 may present a pre-authorization key to one of the controllers to seek access to the respective data storage unit. If authorization is granted, the controller may open a backchannel to the respective data storage unit, as indicated by the thin solid line, to activate the data storage unit out of its state of dormancy. Data orchestrator 322 may then communicate directly with the activated data storage unit, as indicated by the thick dashed line. The thick dashed line may indicate that the data in the data storage units is dormant until it is woken up by a controller. Data orchestrator 322 may provide data to the data storage units to store the data in the latter. Data orchestrator 322 may request and receive data from the data storage units.

Figure 3B:
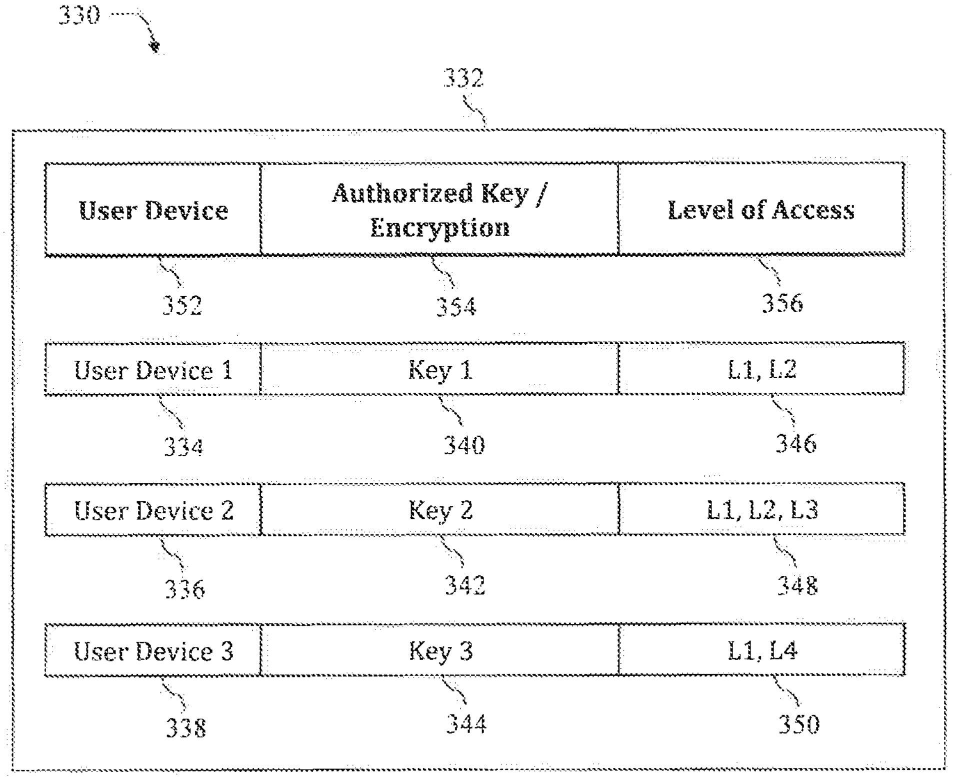

FIG. 3B shows an illustrative diagram 330. The diagram may represent a data map 332, represented in FIG. 3A as data map 324. The data map may provide a correlation between a user device 352, an authorized key or encryption 354, and a level of access 356. For example, user device 1 334 may present an authorized key 1 340 which may result in a level of access of L1 and L2 346. User device 2 336 may present an authorized key 2 342 which may result in a level of access of L1, L2 and L3 348. User device 3 338 may present an authorized key 3 344 which may result in a level of access of L1 and L4 350. Data orchestrator 322 from FIG. 3A may communicate with the data map 332 by presenting a user device and its correlating authorization key and/or encryption, for example, a user key or token and a device key or token. The data map 332 then provides data orchestrator 322 a level of access granted to the user device based on the latter's level of credentials.

Figure 3C:
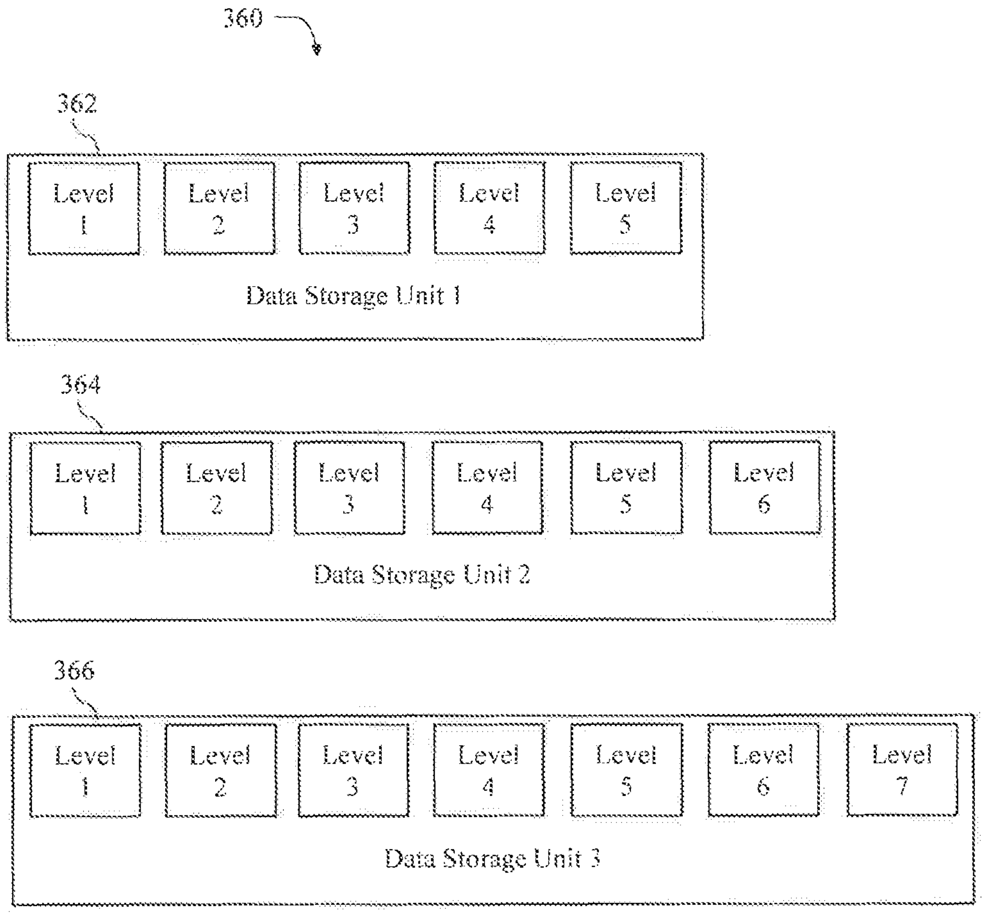

FIG. 3C shows an illustrative diagram 360. The diagram may represent a series of data storage units such as the data storage units found in FIG. 3A. Data storage unit 1 362 may contain, for example, five levels of data storage, level 1, level 2, level 3, level 4, and level 5. The five levels may correspond to distinct levels of sensitivity of data. Therefore, a user device may present credentials that all access so some levels of data but not all levels of data. Data storage unit 2 364 may contain six levels of data storage, level 1, level 2, level 3, level 4, level 5, and level 6. Data storage unit 3 366 may contain seven levels of data storage, level 1, level 2, level 3, level 4, level 5, level 6, and level 7. Five, six, and seven levels of data storage may be exemplary, but any number of levels may be possible.

Figure 4:
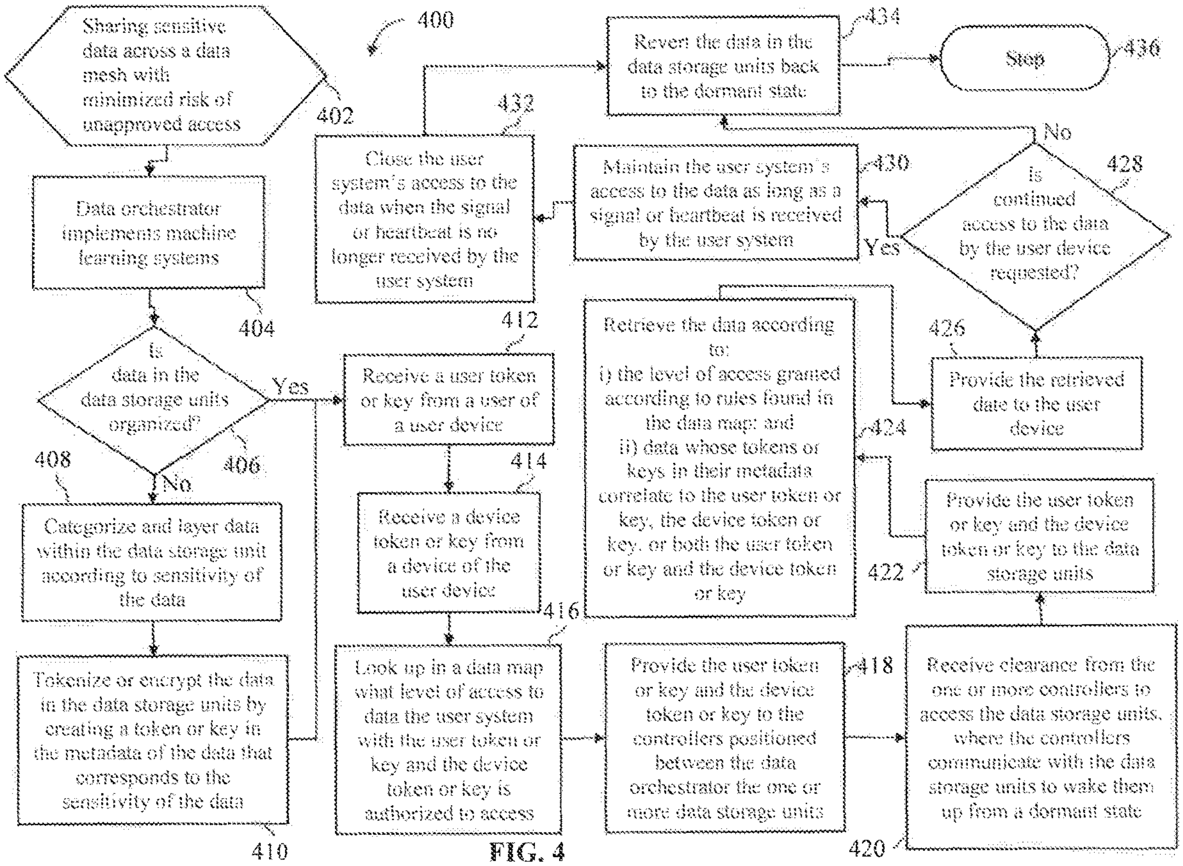
FIG. 4 shows an illustrative flowchart in accordance with principles of the disclosure.

FIG. 4 shows an illustrative flowchart 400. The flowchart starts at 402 and may present a method for sharing sensitive data across a data mesh or data network with a minimized risk of unapproved access to the sensitive data. At step 404, data orchestrator may implement machine learning systems. At step 406, the data orchestrator may determine if the data in the data storage units is organized. If the sensitive data is organized, the method may continue at step 412 where the data orchestrator receives a user token or key from a user of a user device. If the data is not organized, the method may continue at step 408 where the data orchestrator may categorize and layer data within the data storage unit according to sensitivity of the data. At step 410, the data orchestrator may apply a token or to data in the data storage units, for example, by creating a token or key in the metadata of the data that may correspond to the sensitivity of the data. At step 412, the data orchestrator receives a user token or key from a user of a user device.

At step 414, the data orchestrator receives a device token or key from a device of the user device. At 416, the data orchestrator may look up in a data map what level of access to data the user device with the user token or key and the device token or key is authorized to access. At step 418, the data orchestrator may provide the user token or key and the device token or key to the controllers positioned between the data orchestrator the one or more data storage units. At step 420, the data orchestrator may receive clearance from the one or more controllers to access the data storage units, where the controllers may communicate with the data storage units to wake them up from a dormant state. At step 422, the data orchestrator may provide the user token or key and the device token or key to the data storage units. At step 424, the data orchestrator may retrieve the data according to: i) the level of access granted according to rules found in the data map; and ii) data whose tokens or keys in their metadata correlate to the user token or key, the device token or key, or both the user token or key and the device token or key. At step 426, the data orchestrator may provide the retrieved data to the user device.

At step 428, the data orchestrator may determine if the user device requests continued access to the data. If the user device requests continued access, at step 430, the data orchestrator may maintain the user device's access to the sensitive data when receiving a signal or heartbeat from the user device. At step 432, the data orchestrator may close the user device's access to the data when the signal or heartbeat is no longer received by the user device. At step 434, the data orchestrator may revert the data in the data storage units back to the dormant state. If the user device does not request continued access, then the process may continue at this step 434 with the data orchestrator reverting the data in the data storage units back to the dormant state. At step 436, the data orchestrator may stop the method as the method may be completed.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for multiple artificial intelligence systems for use with dynamic access capabilities are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for sharing sensitive data stored in one or more data storage units across a data mesh in a manner that minimizes risk of unapproved access to sensitive data, the system comprising:

a data mesh;

a data orchestrator operating in the data mesh;

one or more data storage units located in the data mesh in electronic communication with the data orchestrator, wherein:

sensitive data stored in the one or more data storage units is kept in a dormant state;

the dormant state is a default setting for storage of sensitive data in the one or more data storage units; and sensitive data stored in the one or more data storage units contains metadata tokenization that requires receipt of tokens to gain access to sensitive data;

one or more controllers located in the data mesh in electronic communication with the data orchestrator and the one or more data storage units;

one or more user devices in the data mesh in electronic communication with the data orchestrator, wherein each user device comprises a user and a device;

a data map in electronic communication with the data orchestrator;

wherein the data orchestrator is configured to implement one or more machine learning systems to:

coordinate with the one or more controllers through backchannel communication to wake up the one or more data storage units from the dormant state;

wherein the one or more machine learning systems create a usage model for users of the one or more user devices based on historical access patterns and determine inappropriate use indicating an impostor attempting to access a user's account by detecting deviations from the usage model;

receive a user token from the user of the one or more user devices;

receive a device token from a device of the one or more user devices;

look up in the data map what level of access to sensitive data the one or more user devices are authorized with the user token and the device token;

provide the user token and the device token as a pre-authorization code to the one or more controllers positioned between the data orchestrator the one or more data storage units;

receive clearance from the one or more controllers to access the sensitive data on the one or more data storage units, wherein the one or more controllers communicate by way of a backchannel to wake up the one or more data storage units from a dormant state;

communicate with the one or more data storage units to categorize the sensitive data within the one or more data storage units according to confidentiality of the sensitive data;

provide the user token and the device token to the one or more data storage units after the one or more data storage units is woken up from a dormant state, where the data orchestrator can only access sensitive data whose metadata tokenization has been satisfied by the user token and device token;

retrieve the sensitive data according to:

a level of access granted according to rules found in the data map; and sensitive data whose tokens in their metadata correlate to the user token and the device token;

provide retrieved sensitive data to the user device;

determine if continued retrieval is required by the user device;

when continued retrieval is required as indicated by a receipt of a signal from the user device, provide the user device with continued access to the sensitive data;

said signal received from the user device is a heartbeat signal; and revert the sensitive data in the data storage unit back to the dormant state when the user device no longer needs access to the sensitive data.

2. The system of claim 1, wherein the data orchestrator is further configured to implement one or more machine learning systems to communicate with the one or more data storage units to layer the sensitive data within the one or more data storage units according to confidentiality of the sensitive data, wherein the data orchestrator layers the sensitive data in layers such that a user can readily access the sensitive data in accordance with the user's level of credentials, and wherein the one or more machine learning systems optimize the data orchestrator's communication with the one or more data storage units to enable layered access to the sensitive data according to user credential levels.

3. The system of claim 1, wherein the one or more machine learning systems are deep learning systems that create artificial neural network structures to optimize the data orchestrator's communication with the one or more data storage units for implementing confidentiality-based categorization and retrieval of the sensitive data.

* * * * *